June 16, 1942.  H. W. ROGERS  2,286,648
FRUIT PARING MACHINE
Filed Feb. 15, 1940  2 Sheets-Sheet 1

INVENTOR.
Harrison W. Rogers
by Daniel Lelten Moore
ATTORNEY.

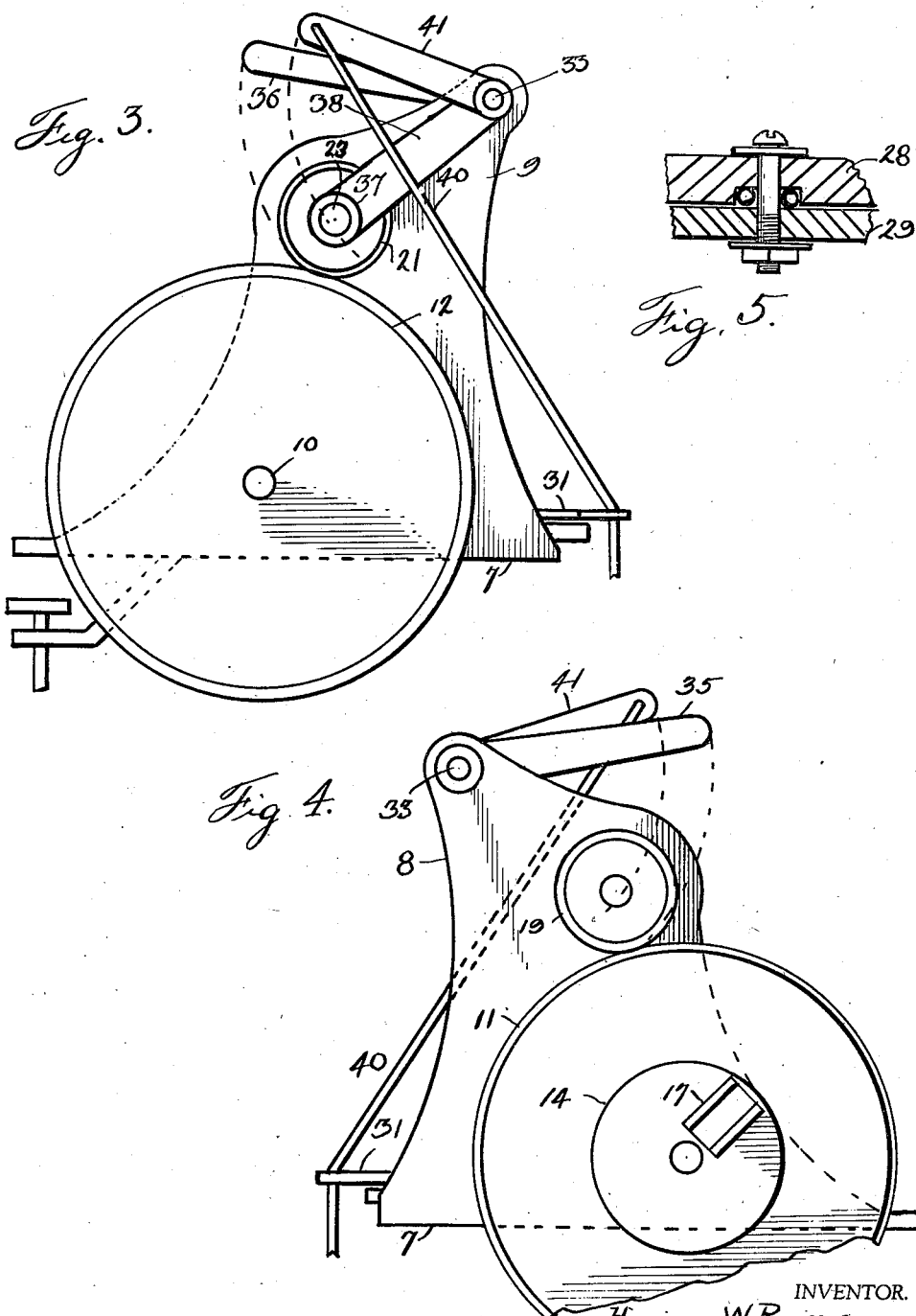

UNITED STATES PATENT OFFICE 2,286,648

FRUIT PARING MACHINE

Harrison W. Rogers, Sebring, Fla.

Application February 15, 1940, Serial No. 319,024

1 Claim. (Cl. 146—43)

The present invention relates to improvements in fruit paring machines, one object of the invention being the provision of a simple, inexpensive bench machine, which can be quickly installed so as to be hand fed, yet to be either hand or machine operated.

Another object of the invention is the provision of a paring machine in which two rotary chucks rotate the held fruit while the body rind is removed by the usual swingingly mounted knife, while a manually actuated pair of polar end removing knives are operated to sever the polar end simultaneously and while the fruit is still held and rotated by the chucks.

To fully understand and appreciate the advantages of this device attention is invited to the accompanying drawings, in which:

Figure 3 is a view taken from the right side end thereof.

Figure 4 is a similar view taken from the other side.

Figure 5 is a section taken on line 5—5 of Fig. 2.

Figure 1:
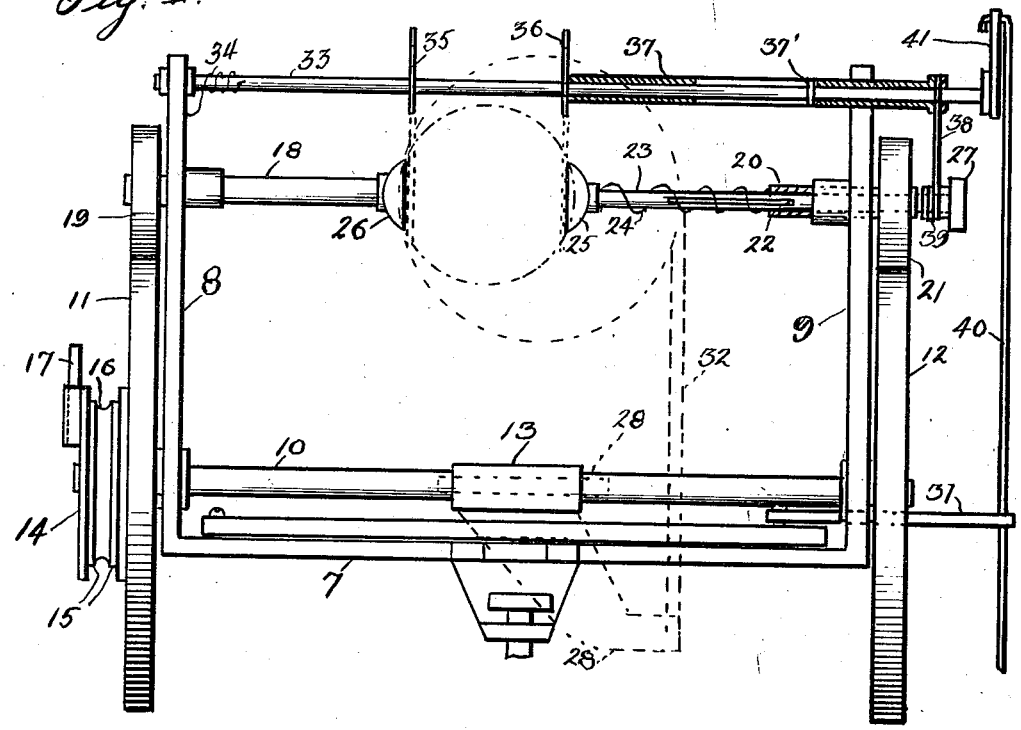
Figure 1 is a front view of the complete machine, certain parts being shown in dotted lines.
Figure 2:
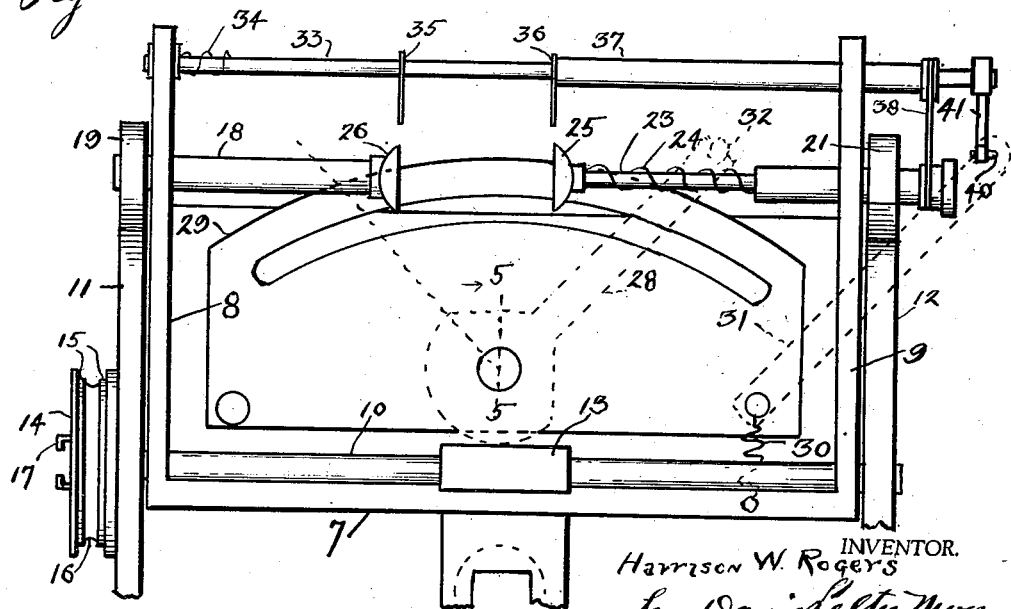
Figure 2 is a top plan view thereof, with certain parts in dotted lines.

Referring to the drawings, the numeral 7 designates the main casting of the machine, which has upstanding therefrom the two spaced standards 8 and 9. These standards are sufficiently high to accommodate the machine to small and the largest oranges and grapefruit.

A shaft 10 is journaled in the standards and has mounted exteriorly of and adjacent each standard and thereon the two large gears 11 and 12, and is provided with a worm 13 intermediate of its ends. A pulley 14 is fast to the operating end of the shaft 10 and is provided with the flat faces 15 to accommodate a flat drive belt and with the semi-circular groove 16 to accommodate a round belt, although the pulley may be made to receive A and B belts where desired. A hand drive crank 17 is removably attached to the pulley so that the machine may be hand operated.

A shaft 18 is mounted in the upper end of the standard 8 and carries a gear 19 which meshes at all times with and is driven by the gear 11, while a hollow or tubular shaft 20 is mounted for rotation in the upper end of the standard 9 and carries a gear 21 of the same size as the gear 19, meshing and to be driven by the gear 8, simultaneously with the shaft 18. Mounted by means of a spline 22 and to be rotated with the tubular shaft 20 is a shaft 23, and on this shaft is an extension coiled spring 24, which holds the chuck 25 resiliently toward the chuck 26, which latter chuck is carried and rotated by the shaft 18. Upon the outer end of the slidable shaft 23 is mounted a knob 27 by means of which the shaft and its chuck may be pulled outwardly to accommodate different diametered fruit.

The worm 13 acts upon the gear segment 28, which is mounted for swinging movement upon the swingable plate 29, so that the gears may be meshed by the spring 30 or placed out of mesh by the hand lever 31, which moves the plate 29 in opposition to the spring, and when it is desired to return the swinging knife carrying arm 32 to return position and ready for a new fruit. This is of regular construction and can be readily understood, it being of a type of paring mechanism long in use, except that in this instance both chucks and not only one are rotated.

This much constitutes the body rind paring mechanism.

To provide means for cutting off the polar or button ends, while the fruit is still held by the chucks and being rotated, an oscillatory shaft 33 is mounted in the extreme ends of the standards 8 and 9, and a spring 34 normally holds this shaft so that the knives 35 and 36 are held out of engagement with the fruit, or away from the chucks.

The chuck 26 which is fixed with relation to the standard 8 has the knife 35 to cooperate therewith, but as the chuck 25 is not always in the same position relative to the chuck 26 and its standard 9, the knife 36 must move simultaneously therewith, and in order to do this, this knife is mounted at the inner end of the tubular shaft 37, which is splined at 37' to the shaft 33 and rockable therewith. Its outer end, however, extends externally of the standard 9 and above the gear 21, and carries an arm 38, carrying a yoke 39 upon its free end, so that said yoke engages the shaft 23 adjacent the knob 27, and thus when the shaft 23 and its chuck 25 is moved in or out, the knife 36 is maintained in the same relative position to its chuck 25.

When the operator has placed the fruit between the chucks, the spring 24 has resiliently pressed the fruit relatively firm between the chucks, the shaft 10 is rotated to in turn operate the body rind paring mechanism and rotate the chucks as the knife thereof is passed longitudinally above the chucks. When the body rind has been removed, the hand lever 31 is operated to release the segmental gear from its worm, and its spring, not shown, returns the swinging arm and its knife to starting position, the operator, then depressing foot pedal A, not shown, which pulls upon the connection 40, and through the crank arm 41, oscillates the shaft 33 to bring the two knives 35—36 into engagement with the fruit which is still being rotated, or is started to rotate, as the operator still holds the hand lever for the return of the body rind removing knife carrying arm or the connection 40 moves the lever 31 when pulled upon. As soon as the knives have moved sufficiently far downwardly to sever the polar ends, the operator releases the foot pedal, so that spring 34 returns the shaft 33 and the knives to uppermost position, at which time the operator releases the lever and removes the fruit from between the chucks.

This machine may be made as a portable unit with a clamp 42 or it may be screwed upon a bench or table.

What is claimed, is:

A fruit paring machine, including in combination, a main frame, a main shaft journaled therein, means for driving the same, two gears carried by said main shaft exterior of the frame one at each end of the shaft, a solid and a hollow shaft journaled in the main frame spaced from and parallel to the main shaft, two gears, one carried by each of the latter shafts and meshing with the respective first two gears to be operated from the main shaft, a chuck carried upon the inner end of the solid shaft, a longitudinally slidable shaft mounted in and splined to be rotated by and with the hollow shaft, said slidable shaft extending beyond both ends of the hollow shaft, a chuck carried upon the inner end of the hollow shaft for cooperation with the first chuck to hold and rotate the fruit to be pared, a spring for resiliently holding the latter chuck toward the first chuck, a rocking shaft mounted in the main frame and parallel with the other shafts, a knife blade carried by the rocking shaft adjacent the first chuck, a tubular shaft splined to and slidable upon the rocking shaft and extending exteriorly of the main frame, a second knife blade carried upon the inner end of said tubular shaft adjacent to the chuck carried by the slidable shaft, means connecting the slidable shafts for manual movements in unison, a spring for holding the rocking shaft with the knife blades away from fruit engagement, and manually operated means for rocking the shaft in opposition to said spring and to cause the knife to engage the fruit held between the two chucks to sever the button ends of the rind of such fruit engaged by the respective chucks.

HARRISON W. ROGERS.